United States Patent
Essa et al.

(10) Patent No.: US 12,429,342 B2
(45) Date of Patent: Sep. 30, 2025

(54) SYSTEMS AND METHODS FOR IDENTIFYING AN OPTIMAL ROUTE FOR NETWORK PERFORMANCE TESTING

(71) Applicant: Verizon Patent and Licensing Inc., Basking Ridge, NJ (US)

(72) Inventors: Ammara Essa, Los Angeles, CA (US); Timothy E. Coyle, Chicopee, MA (US); Hector Alejandro Garcia Crespo, N Richland Hills, TX (US); Matthew Kapala, North Billerica, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 129 days.

(21) Appl. No.: 18/535,018

(22) Filed: Dec. 11, 2023

(65) Prior Publication Data
US 2025/0189322 A1   Jun. 12, 2025

(51) Int. Cl.
*G01C 21/34*   (2006.01)
*H04B 17/30*   (2015.01)

(52) U.S. Cl.
CPC ......... *G01C 21/3407* (2013.01); *H04B 17/30* (2015.01)

(58) Field of Classification Search
CPC ..... G01C 21/34; G01C 21/3407; H04B 17/30
USPC ........................................................ 701/411
See application file for complete search history.

(56) References Cited

U.S. PATENT DOCUMENTS

| | | | |
|---|---|---|---|
| 10,070,409 B2* | 9/2018 | Thompson | H04W 64/00 |
| 10,119,826 B2* | 11/2018 | Di Lorenzo | G01C 21/3446 |
| 10,976,164 B2* | 4/2021 | Zhang | G01C 21/3811 |
| 11,619,513 B2* | 4/2023 | Sheha | G01C 21/3676 |
| | | | 701/412 |
| 2020/0322814 A1* | 10/2020 | Tofighbakhsh | H04W 24/02 |
| 2023/0153567 A1* | 5/2023 | Keski-Valkama | G06N 3/04 |
| | | | 706/15 |
| 2023/0168094 A1* | 6/2023 | Beaurepaire | G01C 21/3697 |
| | | | 701/425 |

* cited by examiner

*Primary Examiner* — Andrew Joseph Rudy

(57) ABSTRACT

A device may receive user criteria associated with a route for network performance testing of a network, network data associated with the network, and cartographic data associated with a location of the network. The device may calculate network spatial data based on the user criteria and the network data, and may perform feature extraction of the network spatial data to calculate network statistics and to extract network event locations. The device may generate waypoint criteria based on the network statistics and the network event locations, and may map the network spatial data to valid roadways identified in the cartographic data to generate mapped data. The device may identify a list of viable waypoints based on comparing the mapped data and the waypoint criteria, and may process the list of viable waypoints, the network data, and the cartographic data, with a clustering model, to generate the route.

20 Claims, 11 Drawing Sheets

Process the list of viable waypoints, the network data, and the cartographic data, with a clustering model, to generate the route for the network performance testing

SYSTEMS AND METHODS FOR IDENTIFYING AN OPTIMAL ROUTE FOR NETWORK PERFORMANCE TESTING

BACKGROUND

Performance testing of a network (e.g., a radio access network (RAN)) may ensure that the network continuously conforms with network standards (e.g., fifth generation (5G) standards). Network performance testing may include traveling to different locations associated with the network (e.g., via routes) and testing network performance at the different locations.

DETAILED DESCRIPTION OF EXAMPLE EMBODIMENTS

Figure 1A:
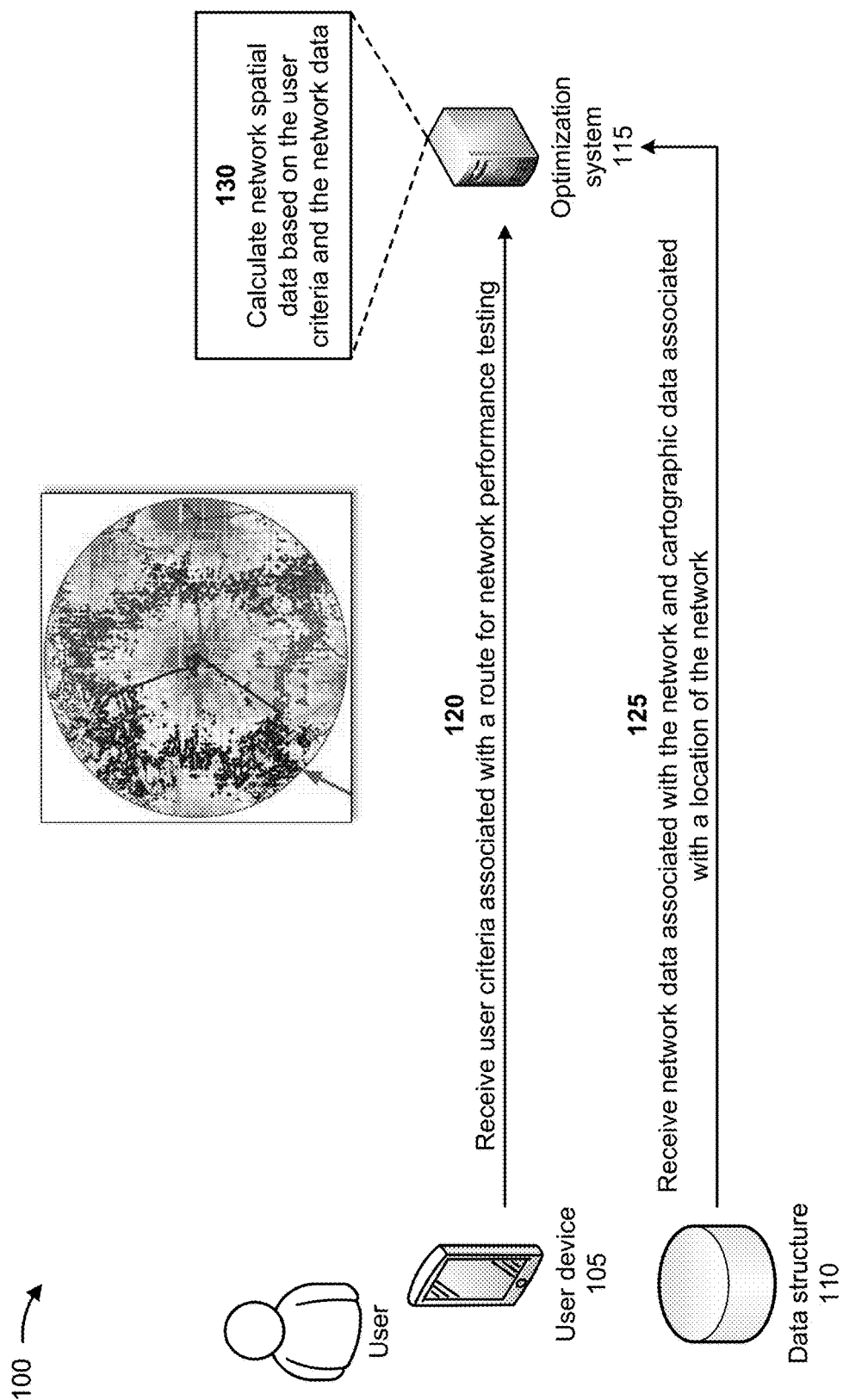
FIGS. 1A-1G are diagrams of an example associated with identifying an optimal route for network performance testing.

The following detailed description of example implementations refers to the accompanying drawings. The same reference numbers in different drawings may identify the same or similar elements.

The current process for creating network performance profiles and testing routes (e.g., for traveling via vehicle or a remote device, such as a drone, a robot, and/or the like) are inefficient and inconsistent. As a network continues to expand rapidly, even more routes are required to measure network performance and to ensure exceptional customer experience and coverage. Currently, field engineers may manually create drive routes for capturing key performance characteristics of a network, such as reference signal received power (RSRP), signal-to-interference-plus-noise ratio (SINR), intra-cell handovers, inter-cell handovers, and/or the like. The manual creation of drive routes is time consuming, prone to error, and inefficient. Thus, current techniques for efficiently determining network performance profiles and testing routes consumes computing resources (e.g., processing resources, memory resources, communication resources, and/or the like), networking resources, and/or other resources associated with generating erroneous network performance testing routes, receiving incomplete data based on utilizing erroneous network performance testing routes, regenerating a correct network performance testing route to replace an erroneous network performance testing route, and/or the like.

Some implementations described herein provide an optimization system that identifies an optimal route for network performance testing. For example, the optimization system may receive user criteria associated with a route for network performance testing of a network, network data associated with the network, and cartographic data associated with a location of the network. The optimization system may calculate network spatial data based on the user criteria and the network data, and may perform, based on the user criteria, feature extraction of the network spatial data to calculate network statistics and to extract network event locations. The optimization system may generate waypoint criteria based on the network statistics and the network event locations, and may map the network spatial data to valid pathways (e.g., roadways or the like) identified in the cartographic data to generate mapped data. The optimization system may identify a list of viable waypoints based on comparing the mapped data and the waypoint criteria, and may process the list of viable waypoints, the network data, and the cartographic data, with a clustering model, to generate the route for the network performance testing. In other aspects, the optimization system may identify a list of viable waypoints for one or more drones visiting the various waypoints or even devices traveling through the route to maintain high connectivity or the like. The optimization system may perform one or more actions based on the route.

In this way, the optimization system identifies an optimal route for network performance testing. For example, the optimization system may provide an intelligent, on demand solution that utilizes network data for area of interest to create an optimal drive route that captures key network metrics and events. The optimization system may receive network data, user criteria for performance testing, and geographical data associated with the network, and may analyze the network data, the user criteria, and geographical data. The optimization system may calculate statistics based on analyzing the network data, the user criteria, and geographical data, and may generate an optimized drive route traversing through waypoints that capture relevant network characteristics and events, which may improve efficiency and standardization in network performance testing. Thus, the optimization system may conserve computing resources, networking resources, and/or other resources that would have otherwise been consumed by generating erroneous network performance testing routes, receiving incomplete data based on utilizing erroneous network performance testing routes, regenerating a correct network performance testing route to replace an erroneous network performance testing route, and/or the like.

FIGS. 1A-1G are diagrams of an example 100 associated with identifying an optimal route for network performance testing. As shown in FIGS. 1A-1G, example 100 includes a user device 105 associated with a user, a data structure 110 (e.g., a database, a table, a list, and/or the like), and an optimization system 115. Further details of the user device 105, the data structure 110, and the optimization system 115 are provided elsewhere herein.

As shown in FIG. 1A, and by reference number 120, the optimization system 115 may receive user criteria associated with a route for network performance testing. For example, the user may utilize the user device 105 to specify the user criteria associated with the route for network performance testing. The user criteria may include criteria for testing performance of a network, such as a location of the testing, a time for the testing, an RSRP of the network or one or more cells of the network, an SINR of the network or one or more cells of the network, intra-cell handovers of the network, inter-cell handovers of the network, and/or the like. In one example, the user criteria may include locations of the network with serving cell physical cell identifier (PCI) RSRP at percentiles (e.g., 5th, 25th, 50th, 75th, and 95th) and RSRP decibels per milliwatt (dBm) values of a total service footprint, locations where each new serving PCI performs an inter-eNodeB handover with an adjacent cell, and/or the like. The user device 105 may provide the user criteria associated with the route for network performance testing to the optimization system 115, and the optimization system 115 may receive the user criteria from the user device 105.

In some implementations, the network may include a radio access network (RAN). The RAN may support, for example, a cellular radio access technology (RAT). The RAN may include one or more network entities base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, reflective intelligent surfaces, distributed base station portions (e.g., radio units), or similar types of devices) and other network entities that can support wireless communication for the user device 105. The RAN may transfer traffic between the user device 105 (e.g., using a cellular RAT), one or more base stations (e.g., using a wireless interface or a backhaul interface, such as a wired backhaul interface), and/or core a network. The RAN may provide one or more cells that cover geographic areas. In some implementations, the RAN may perform scheduling and/or resource management for user devices 105 covered by the RAN (e.g., the user device 105 covered by a cell provided by the RAN). In some implementations, the RAN may be controlled or coordinated by a network controller, which may perform load balancing, network-level configuration, and/or other operations. The network controller may communicate with the RAN via a wireless or wireline backhaul. In some implementations, the RAN may include a network controller, a self-organizing network (SON) module or component, or a similar module or component. In other words, the RAN may perform network control, scheduling, and/or network management functions (e.g., for uplink, downlink, and/or sidelink communications of the user device 105 covered by the RAN).

As further shown in FIG. 1A, and by reference number 125, the optimization system 115 may receive network data associated with the network and cartographic data associated with a location of the network. For example, the data structure 110 may store the network data associated with the network and the cartographic data associated with the location of the network. The network data may include data identifying characteristics of the network, such as serving cell data (e.g., by PCI), serving cell RSRP (e.g., in dBm), and/or the like. The cartographic data may include map data identifying features of the location of the network, such as elevation contours, lakes, rivers, streams, buildings, transportation features (e.g., roads, railroad tracks, and/or the like), satellite imagery, physical features, coordinate grids, topographic data, forests, mountains, and/or the like. The data structure 110 may provide the network data associated with the network and the cartographic data associated with the location of the network to the optimization system 115, and the optimization system 115 may receive the network data and the cartographic data from the data structure 110. In some implementations, the optimization system 115 may continuously receive the network data and the cartographic data from the data structure 110, may periodically receive the network data and the cartographic data from the data structure 110, may receive the network data and the cartographic data from the data structure 110 based on requesting the network data and the cartographic data from the data structure 110, and/or the like.

As further shown in FIG. 1A, and by reference number 130, the optimization system 115 may calculate network spatial data based on the user criteria and the network data. For example, the optimization system 115 may utilize spatial data feature engineering to calculate network spatial data based on the user criteria and the network data. Spatial data feature engineering may include the process of developing additional information from raw data using geographic knowledge. Spatial data feature engineering may be utilized between datasets, where geography is used to link information in separate datasets together, or within datasets, where geography can be used to augment the information available for one sample by borrowing from nearby samples. In some implementations, the optimization system 115 may utilize the user criteria to identify the location of the performance testing in the network, and may combine the network data based on the location of the performance testing. For example, the optimization system 115 may combine the serving cell data (e.g., by PCI) and serving cell RSRP (e.g., in dBm), of the network data, based on the location specified in the user criteria. The combination of the serving cell data and the serving cell RSRP may result in a composite layer of data identifying a serving cell PCI footprint and RSRP dBm coverage.

Figure 1B:
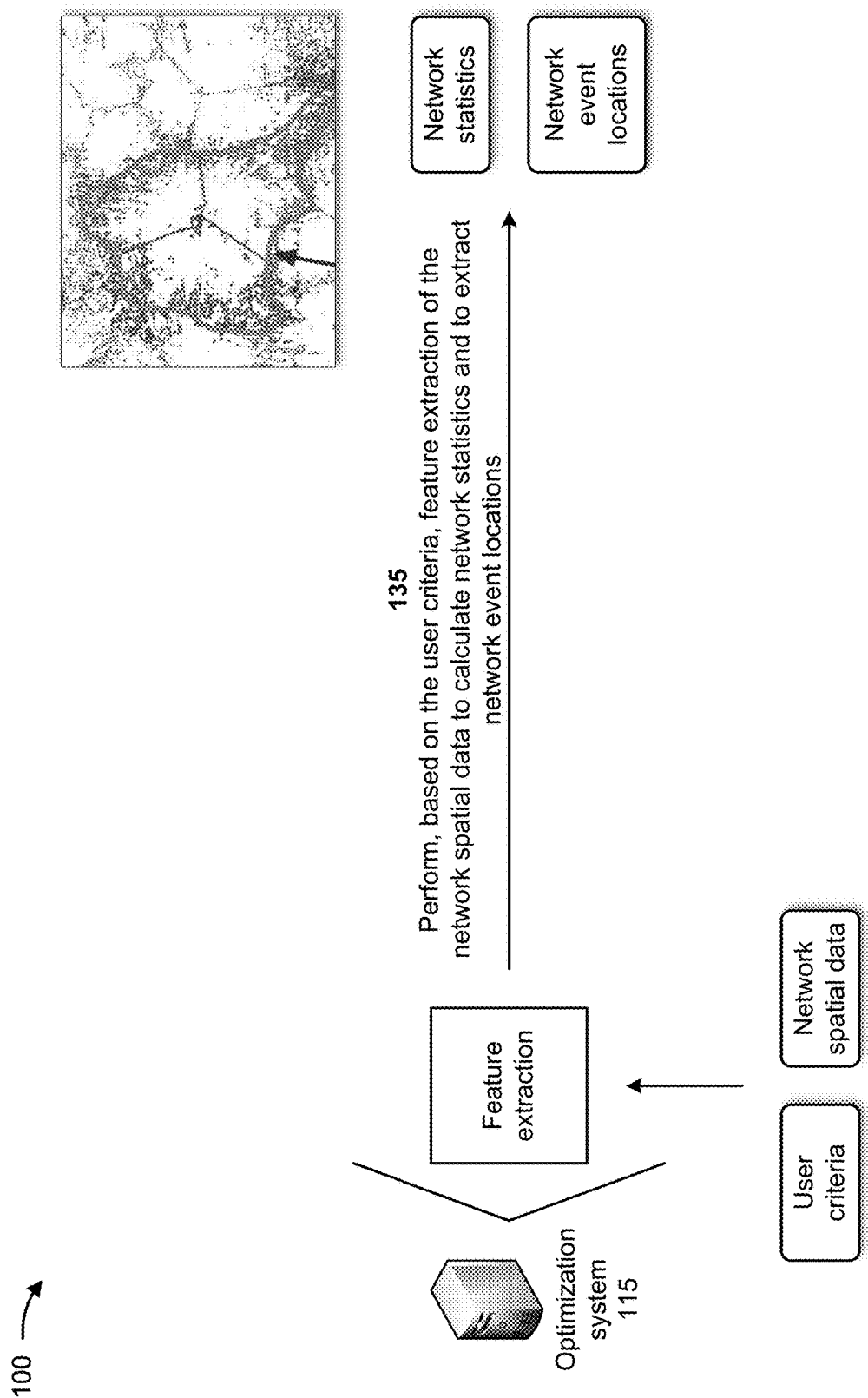

As shown in FIG. 1B, and by reference number 135, the optimization system 115 may perform, based on the user criteria, feature extraction of the network spatial data to calculate network statistics and to extract network event locations. For example, feature extraction may include transforming an original dataset into numerical features that can be processed while preserving information in the original dataset. In some implementations, the optimization system 115 may perform, based on the user criteria, feature extraction of the network spatial data to calculate the network statistics (e.g., RSRP (dBm)) percentile values for new cell activations in the network. For example, if a new site with three PCIs (e.g., serving cells) is activated, the optimization system 115 may calculate RSRP (dBm) values at fixed percentile values for each serving cell. The RSRP (dBm) values may correspond to the network statistics and may be utilized to create a set of RSRP criteria through which waypoints of the route are to traverse.

In some implementations, the optimization system 115 may perform, based on the user criteria, feature extraction of the network spatial data to extract the network performance event locations (e.g., inter-eNB handover boundaries from a new cell activation). For example, if a new site with three PCIs (e.g., serving cells) is activated, the optimization system 115 may identify inter-eNB handover boundaries using spatial machine learning techniques. Spatial machine learning may include a model that predicts, classifies, or clusters unknown locations according to known locations in a training dataset based on a spatial attribute. In some implementations, the optimization system 115 may utilize machine learning to optimize or generate the route.

Figure 1C:
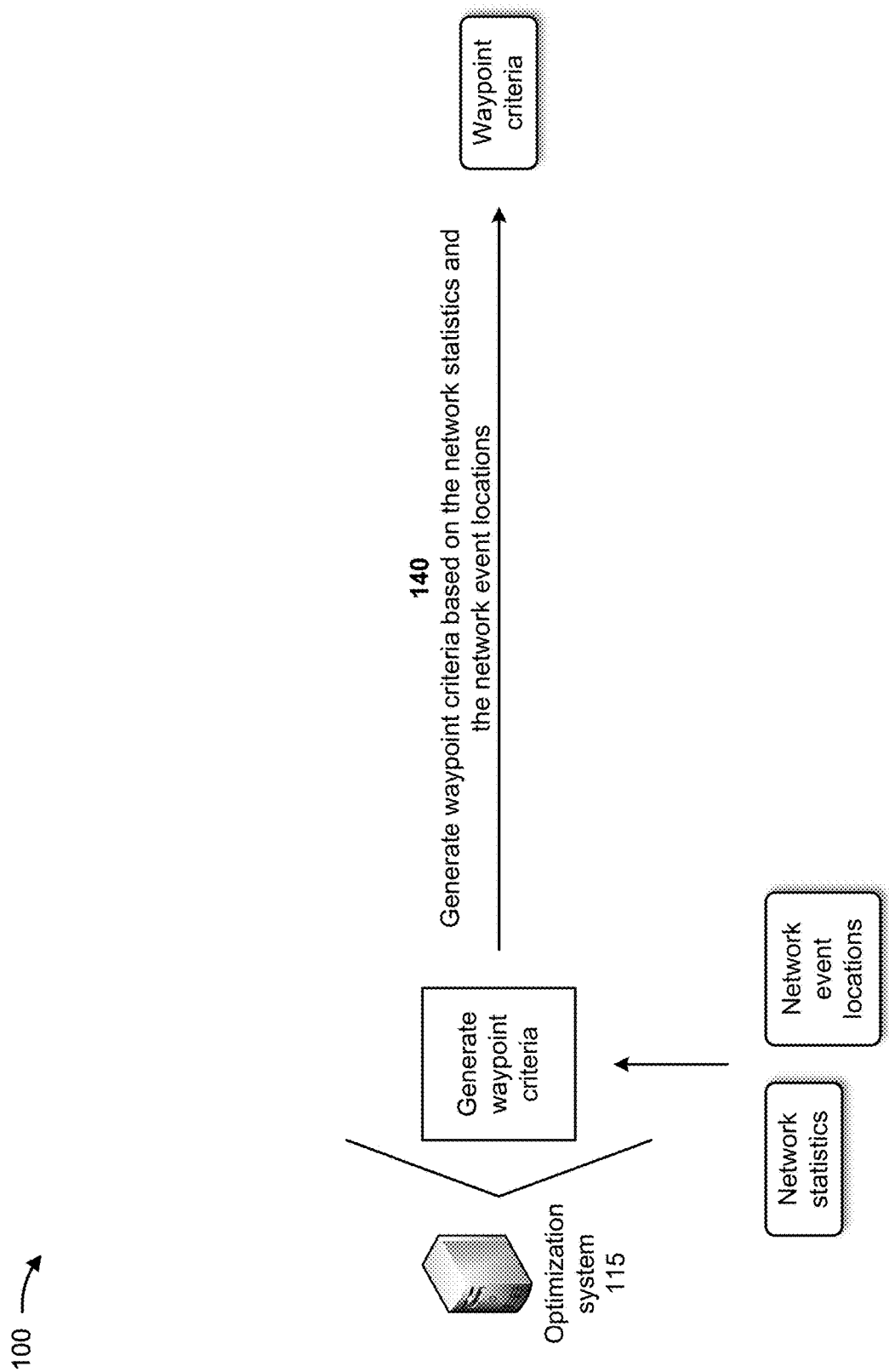

As shown in FIG. 1C, and by reference number 140, the optimization system 115 may generate waypoint criteria based on the network statistics and the network event locations. For example, the optimization system 115 may analyze the network statistics to identify locations associated with the network statistics (e.g., locations of serving cells, handover boundaries, and/or the like). The optimization system 115 may utilize the locations associated with the network statistics to determine waypoints, and may generate the waypoint criteria based on the determined waypoints. In some implementations, the optimization system 115 may utilize the network event locations (e.g., inter-cell boundaries, intra-cell boundaries, and/or the like) to determine waypoints, and may generate the waypoint criteria based on the determined waypoints. In some implementations, the waypoint criteria may identify waypoints that are accessible by a vehicle.

Figure 1D:
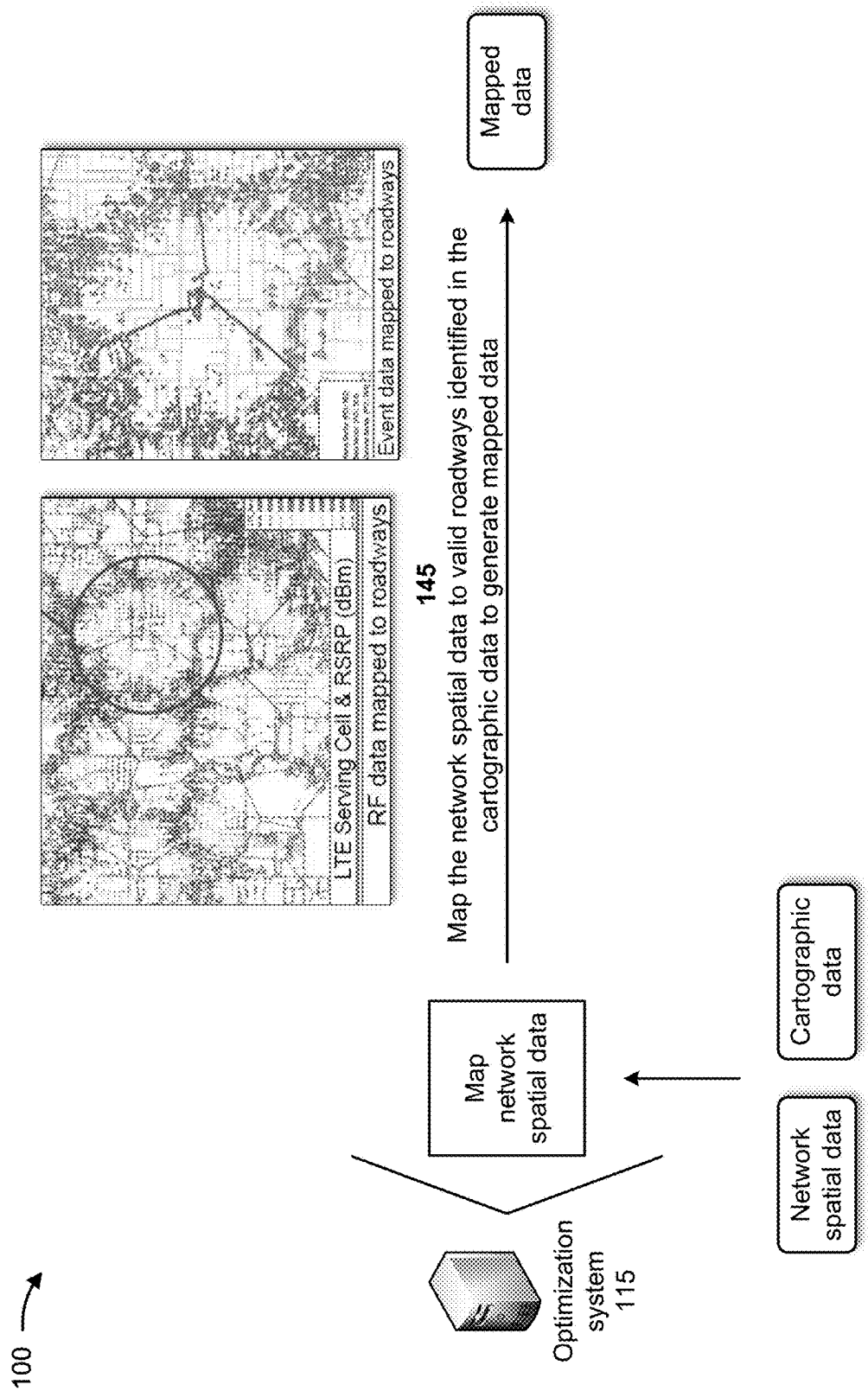

As shown in FIG. 1D, and by reference number 145, the optimization system 115 may map the network spatial data to valid roadways identified in the cartographic data to generate mapped data. For example, the optimization system 115 may geographically bound the network spatial data to the valid roadways identified in the cartographic data to generate the mapped data. In some implementations, the optimization system 115 may geographically bound the serving cell data (e.g., by PCI) and the serving cell RSRP (e.g., in dBm) to the valid roadways. In some implementations, the optimization system 115 may geographically bound network event locations (e.g., inter-cell handover locations) to the valid roadways. The optimization system 115 may geographically bound the network spatial data to the valid roadways to ensure that any subsequently identified waypoints are actually accessible by vehicle (e.g., does not include locations inside buildings, residences, and/or the like).

Figure 1E:
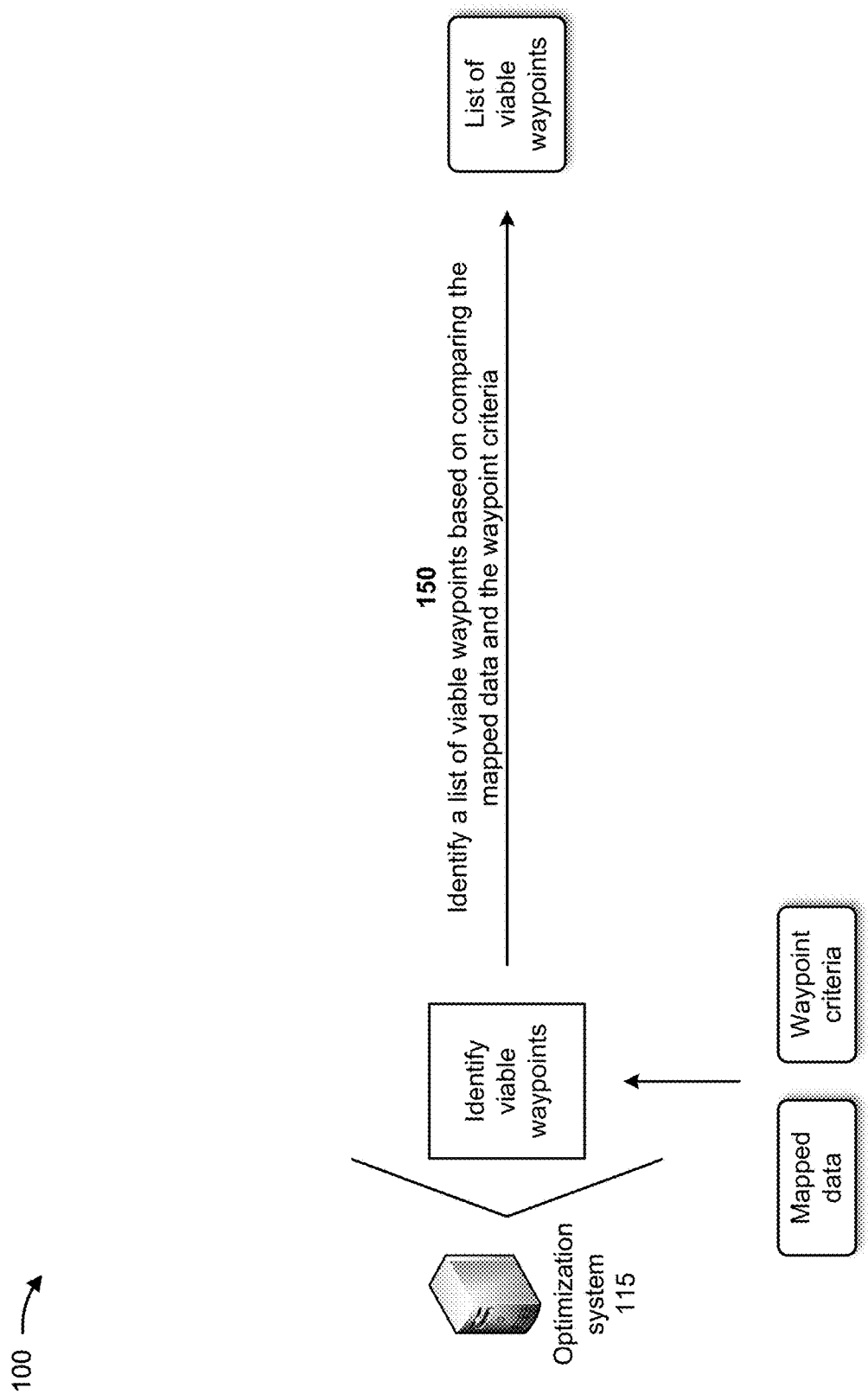

As shown in FIG. 1E, and by reference number 150, the optimization system 115 may identify a list of viable waypoints based on comparing the mapped data and the waypoint criteria. For example, the optimization system 115 may compare the mapped data and the waypoint criteria to determine whether data points (e.g., waypoints) of the mapped data satisfies the waypoint criteria. In some implementations, the optimization system 115 may determine that waypoints of the mapped data satisfy the waypoint criteria. In such implementations, the optimization system 115 may include, in the list of viable waypoints, the waypoints of the mapped data that satisfy the waypoint criteria. Alternatively, the optimization system 115 may determine that waypoints of the mapped data fail to satisfy the waypoint criteria. In such implementations, the optimization system 115 may not include, in the list of viable waypoints, the waypoints of the mapped data that fail to satisfy the waypoint criteria. The optimization system 115 may discard the waypoints of the mapped data that fail to satisfy the waypoint criteria.

Figure 1F:
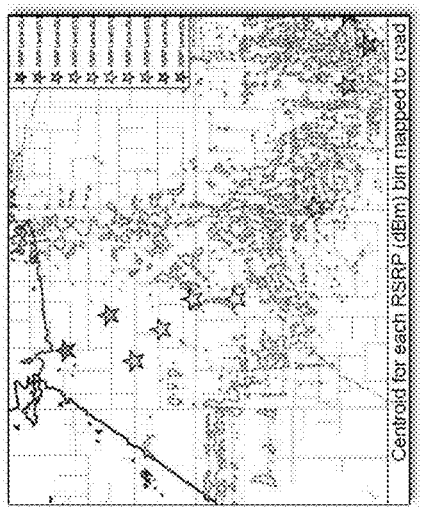
Figure 1F:
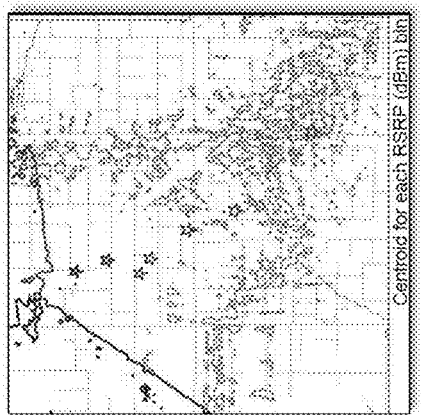
Figure 1F:
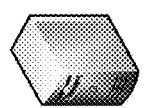

As shown in FIG. 1F, and by reference number 155, the optimization system 115 may process the list of viable waypoints, the network data, and the cartographic data, with a clustering model, to generate the route for the network performance testing. For example, the optimization system 115 may be associated with a clustering model. Further details of the clustering model are provided below in connection with FIG. 2. The optimization system 115 may utilize the clustering model to generate the route for the network performance testing based on the list of viable waypoints, the network data, and the cartographic data.

In some implementations, when processing the list of viable waypoints, the network data, and the cartographic data, with the clustering model, to generate the route for the network performance testing, the optimization system 115 may extract centroids for the network data (e.g., a centroid for each RSRP (dBm)), and may map the centroids for the network data to a nearest road identified in the cartographic data. The optimization system 115 may generate the route for the network performance testing based on mapping the centroids for the network data to the nearest road. In some implementations, when generating the route for the network performance testing, the optimization system 115 may utilize a shortest-path-based route optimization to generate the route for the network performance testing. The shortest-path-based route optimization may include determining a path between two points that has a lowest total cost, where the total cost of a path is a sum of arc costs in that path.

Figure 1G:
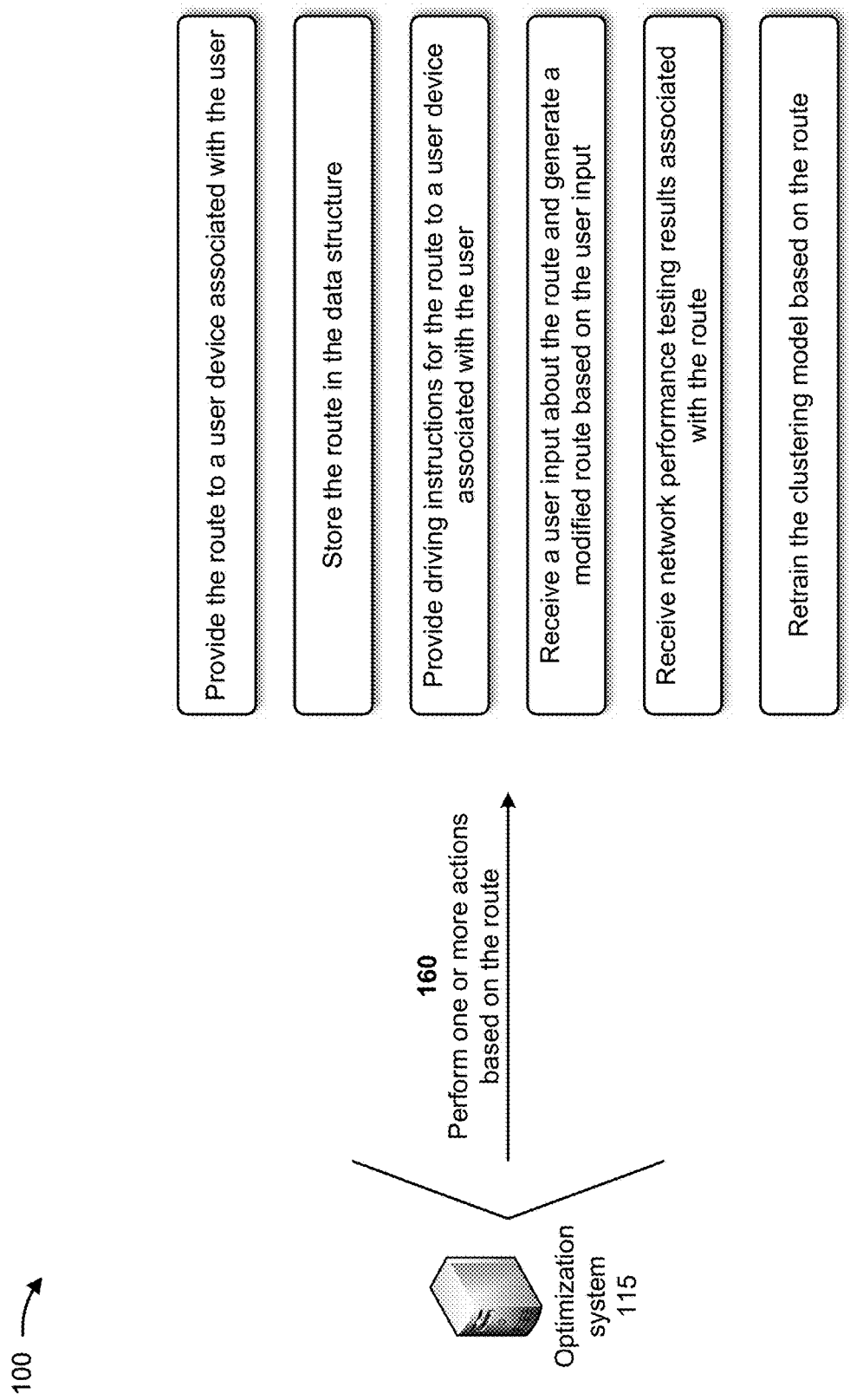

As shown in FIG. 1G, and by reference number 160, the optimization system 115 may perform one or more actions based on the route. In some implementations, performing the one or more actions includes the optimization system 115 providing the route to the user device 105 associated with the user. For example, the optimization system 115 may provide data identifying the route (e.g., and directions) to the user device 105, and the user device 105 may display the route (e.g., and the directions) to the user. The user may follow the directions and conduct the network performance testing. In this way, the optimization system 115 may conserve computing resources, networking resources, and/or other resources that would have otherwise been consumed by generating erroneous network performance testing routes.

In some implementations, performing the one or more actions includes the optimization system 115 storing the route in the data structure 110. For example, the optimization system 115 may store the route in the data structure 110 for future use. The user may utilize the user device 105 to access the route from the data structure 110, and to utilize the route to conduct the network performance testing. In this way, the optimization system 115 may conserve computing resources, networking resources, and/or other resources that would have otherwise been consumed by receiving incomplete data based on utilizing erroneous network performance testing routes.

In some implementations, performing the one or more actions includes the optimization system 115 providing driving instructions for the route to a user device 105 associated with the user. For example, the optimization system 115 may utilize the route to generate driving directions from the location of the user and along the route. The optimization system 115 may provide the directions to the user device 105, and the user device 105 may display the directions to the user. The user may follow the directions and conduct the network performance testing. In this way, the optimization system 115 may conserve computing resources, networking resources, and/or other resources that would have otherwise been consumed by regenerating a correct network performance testing route to replace an erroneous network performance testing route.

In some implementations, performing the one or more actions includes the optimization system 115 receiving a user input about the route and generating a modified route based on the user input. For example, the optimization system 115 may provide data identifying the route to the user device 105, and the user device 105 may display the route to the user. The user may utilize the user device 105 to provide a user input (e.g., changing a waypoint of the route) and to transmit the user input to the optimization system 115. The optimization system 115 may generate a modified route (e.g., with the changed waypoint) based on the user input. In this way, the optimization system 115 may conserve computing resources, networking resources, and/or other resources that would have otherwise been consumed by generating erroneous network performance testing routes.

In some implementations, performing the one or more actions includes the optimization system 115 receiving network performance testing results associated with the route. For example, the optimization system 115 may utilize the route to generate driving directions from the location of the user and along the route. The optimization system 115 may provide the directions to the user device 105, and the user device 105 may display the directions to the user. The user may follow the directions and conduct the network performance testing. The user device 105 may provide network performance testing results to the optimization system 115. In this way, the optimization system 115 may conserve computing resources, networking resources, and/or other resources that would have otherwise been consumed by regenerating a correct network performance testing route to replace an erroneous network performance testing route.

In some implementations, performing the one or more actions includes the optimization system 115 retraining the clustering model based on the route. For example, the optimization system 115 may utilize the route as additional training data for retraining the clustering model, thereby increasing the quantity of training data available for training the clustering model. Accordingly, the optimization system 115 may conserve computing resources associated with identifying, obtaining, and/or generating historical data for training the clustering model relative to other systems for identifying, obtaining, and/or generating historical data for training machine learning models.

In some implementations, performing the one or more actions includes the optimization system 115 causing the route to be utilized to identify an area of the network with network performance issues; causing the route to be utilized to validate quality of service (QoS) requirements of the network; causing the route to be utilized to validate a coverage area of the network; causing the route to be utilized to test a new cell activation in the network; providing the route to a third party for network performance testing of the network; and/or the like.

In some implementations, the optimal route may be utilized by a remote device (e.g., a drone) to ensure that the drone remains in a particular RF footprint (e.g., within a warehouse, a region, and/or the like). In some implementations, the optimal route may be utilized to determine whether any application (e.g., a streaming application) will always have connectivity, will lose connectivity, and/or the like.

In this way, the optimization system 115 identifies an optimal route for network performance testing. For example, the optimization system 115 may provide an intelligent, on demand solution that utilizes network data for area of interest to create an optimal drive route that captures key network metrics and events. The optimization system 115 may receive network data, user criteria for performance testing, and geographical data associated with the network, and may analyze the network data, the user criteria, and geographical data. The optimization system 115 may calculate statistics based on analyzing the network data, the user criteria, and geographical data, and may generate an optimized drive route traversing through waypoints that capture relevant network characteristics and events, which may improve efficiency and standardization in network performance testing. Thus, the optimization system 115 may conserve computing resources, networking resources, and/or other resources that would have otherwise been consumed by generating erroneous network performance testing routes, receiving incomplete data based on utilizing erroneous network performance testing routes, regenerating a correct network performance testing route to replace an erroneous network performance testing route, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
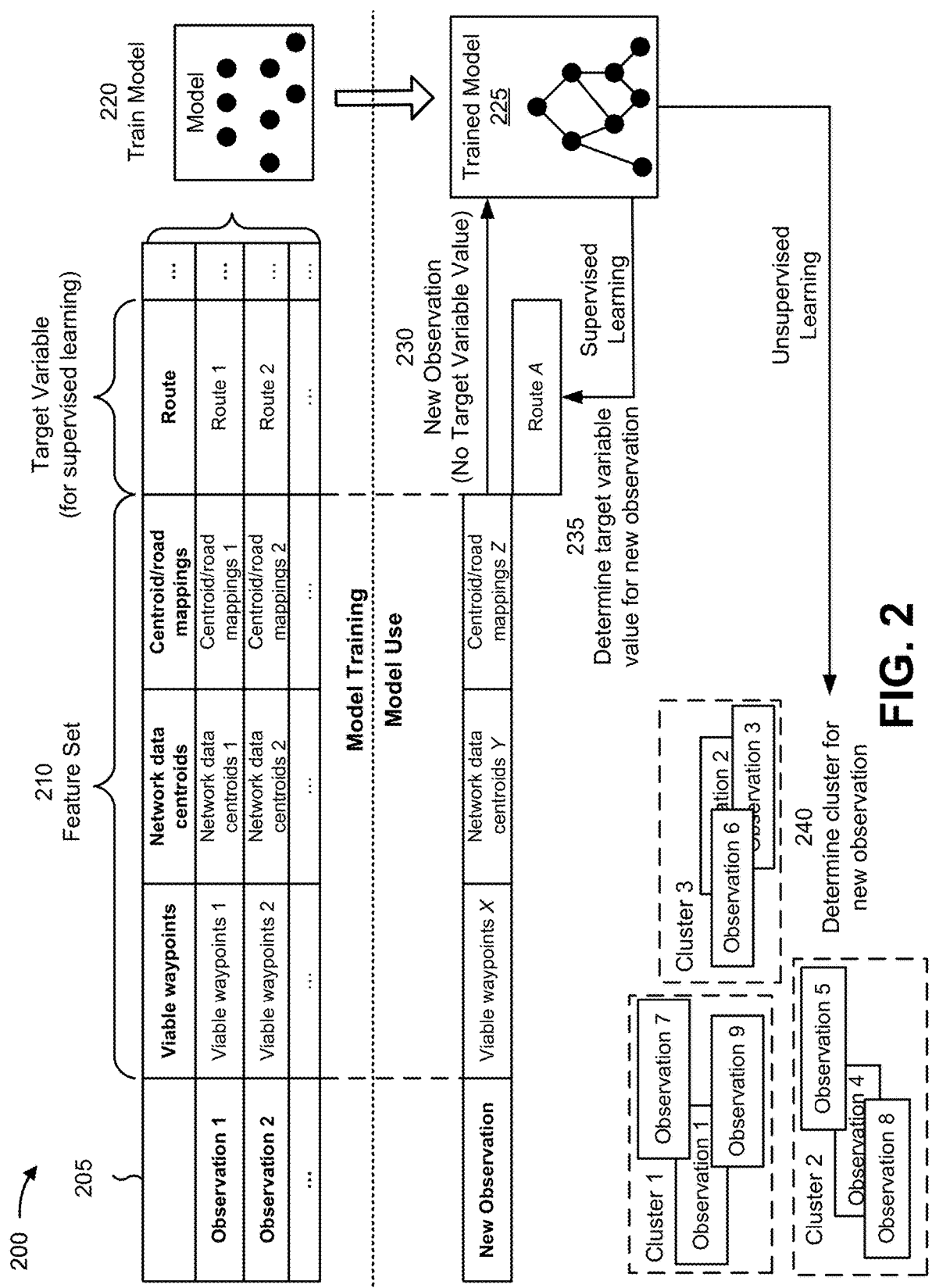
FIG. 2 is a diagram illustrating an example of training and using a machine learning model.

FIG. 2 is a diagram illustrating an example 200 of training and using a machine learning model to identify an optimal route for network performance testing. The machine learning model training and usage described herein may be performed using a machine learning system. The machine learning system may include or may be included in a computing device, a server, a cloud computing environment, and/or the like, such as the optimization system 115 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the optimization system 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the optimization system 115. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of viable waypoints, a second feature of network data centroids, a third feature of centroid/road mappings, and so on. As shown, for a first observation, the first feature may have a value of viable waypoints 1, the second feature may have a value of network data centroids 1, the third feature may have a value of centroid/road mappings 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labeled "route" and may include a value of route 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of viable waypoints X, a second feature of network data centroids Y, a third feature of centroid/road mappings Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of route A for the target variable of the route for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a viable waypoints cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a network data centroids cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to identify an optimal route for network performance testing. The machine learning system enables recognition and/or identification of tens, hundreds, thousands, or millions of features and/or feature values for tens, hundreds, thousands, or millions of observations, thereby increasing accuracy and consistency and reducing delay associated with identifying an optimal route for network performance testing relative to requiring computing resources to be allocated for tens, hundreds, or thousands of operators to manually identify an optimal route for network performance testing.

As indicated above, FIG. 2 is provided as an example. Other examples may differ from what is described in connection with FIG. 2.

Figure 3:
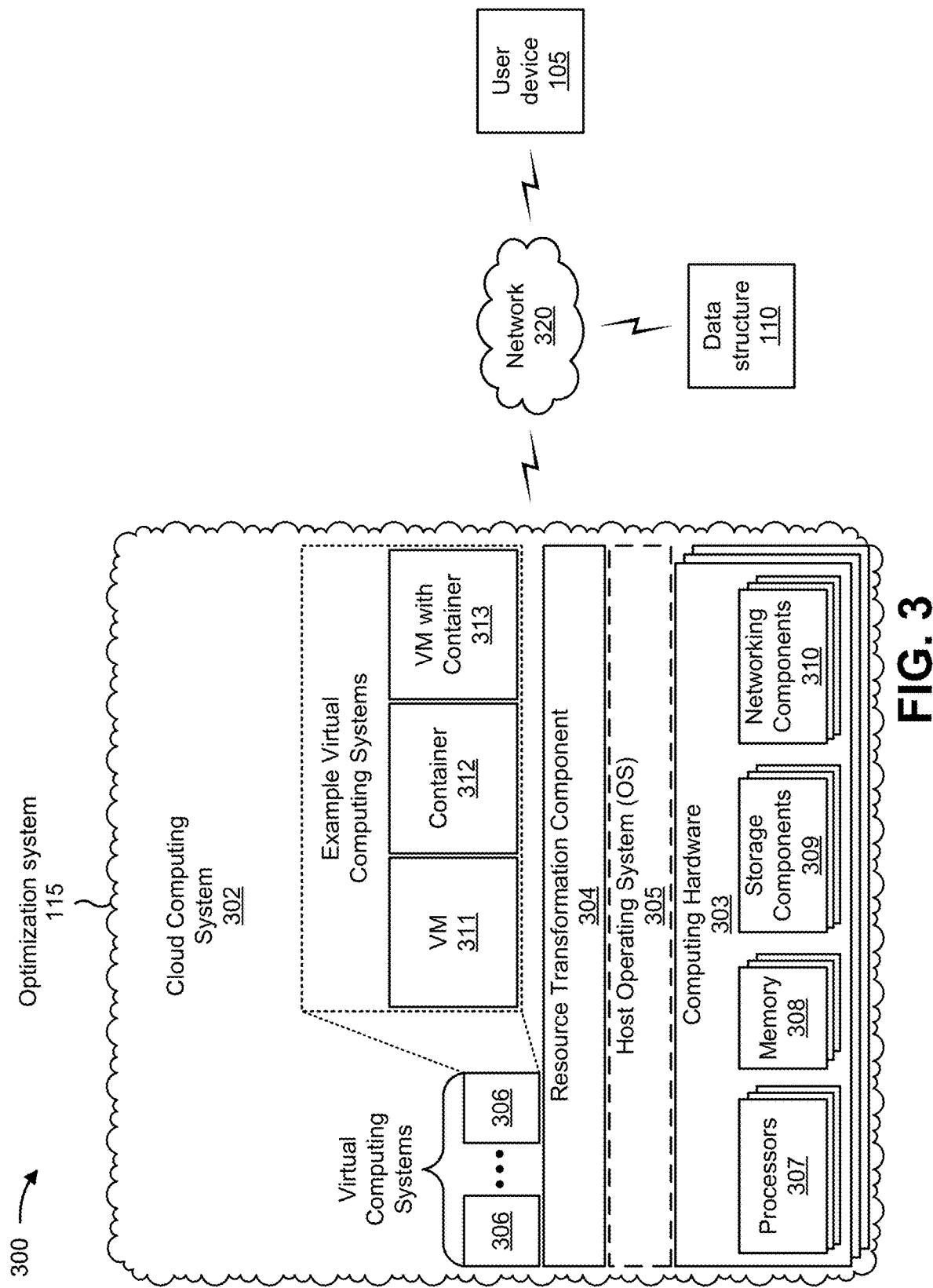
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the optimization system 115, which may include one or more elements of and/or may execute within a cloud computing system 302. The cloud computing system 302 may include one or more elements 303-313, as described in more detail below. As further shown in FIG. 3, the environment 300 may include the user device 105, the data structure 110, and/or a network 320. Devices and/or elements of the environment 300 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), an autonomous vehicle, a drone, an unmanned aerial vehicle (UAV), a robot, or a similar type of device.

The data structure 110 may include one or more devices capable of receiving, generating, storing, processing, and/or providing information, as described elsewhere herein. The data structure 110 may include a communication device and/or a computing device. For example, the data structure 110 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 110 may communicate with one or more other devices of the environment 300, as described elsewhere herein.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the optimization system 115 may include one or more elements 303-313 of the cloud computing system 302, may execute within the cloud computing system 302, and/or may be hosted within the cloud computing system 302, in some implementations, the optimization system 115 may not be cloud-based (e.g., may be implemented outside of a cloud computing system) or may be partially cloud-based. For example, the optimization system 115 may include one or more devices that are not part of the cloud computing system 302, such as the device 400 of FIG. 4, which may include a standalone server or another type of computing device. The optimization system 115 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
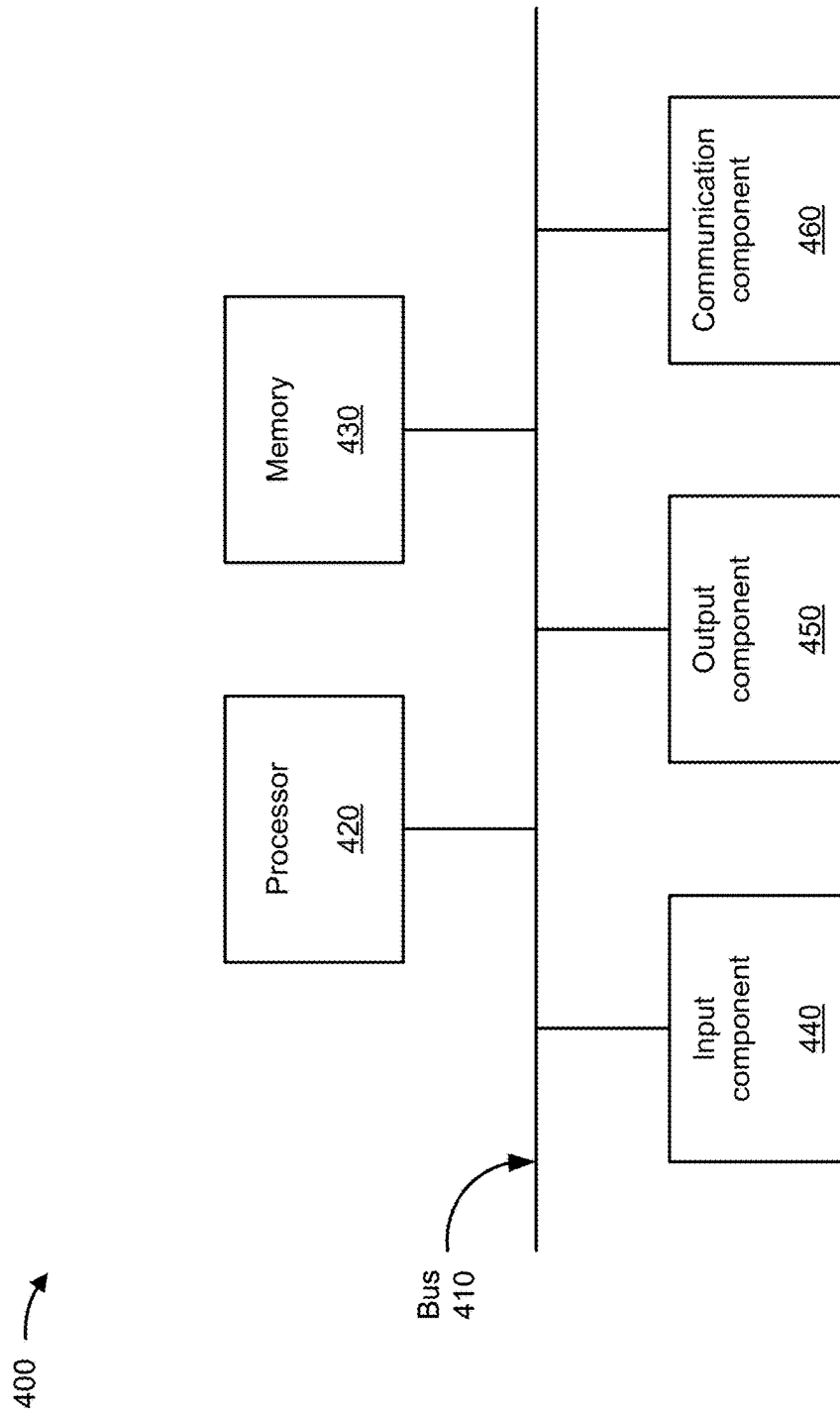
FIG. 4 is a diagram of example components of one or more devices of FIG. 3.

FIG. 4 is a diagram of example components of a device 400, which may correspond to the user device 105, the data structure 110, and/or the optimization system 115. In some implementations, the user device 105, the data structure 110, and/or the optimization system 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
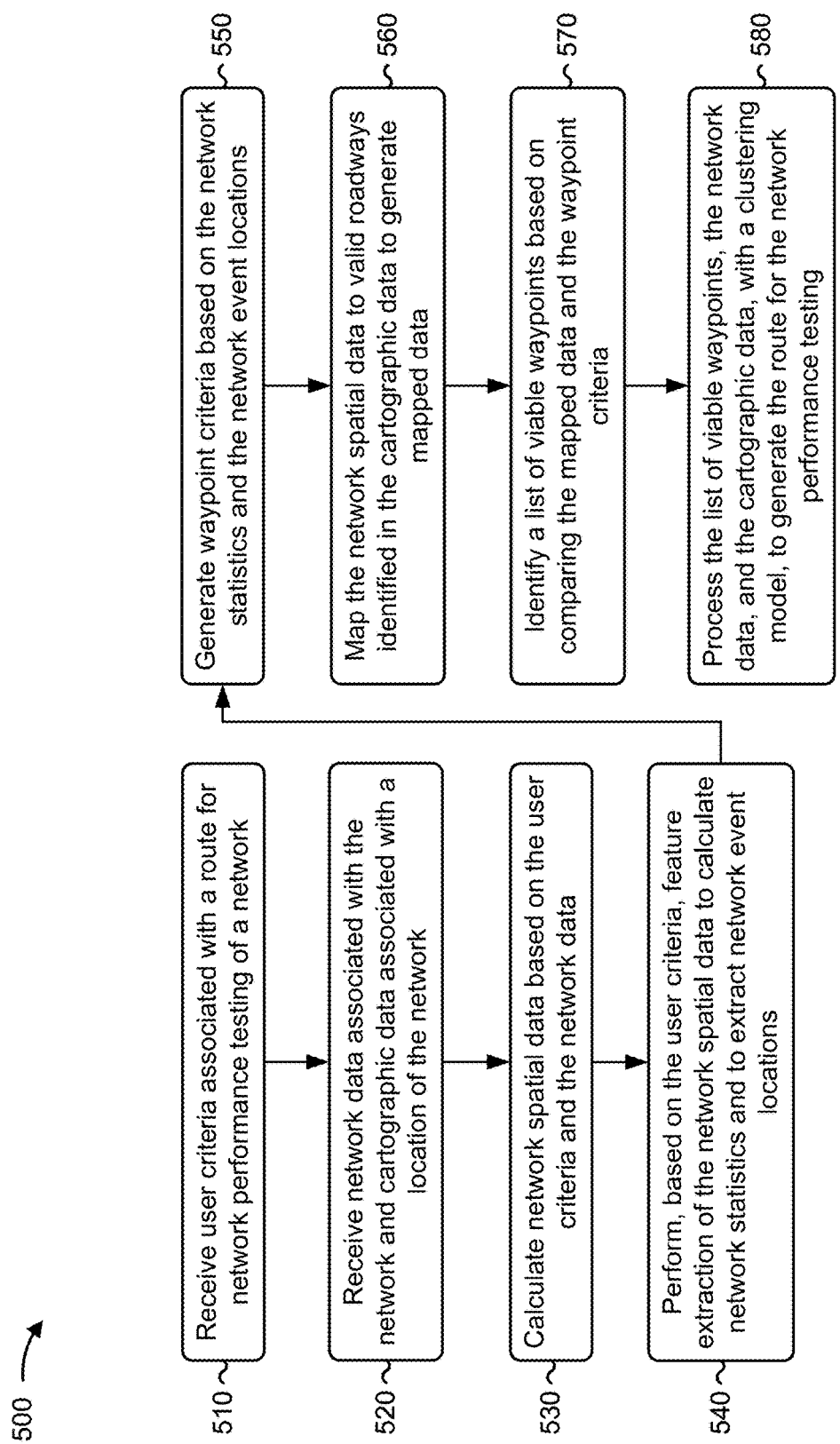
FIG. 5 is a flowchart of an example process for identifying an optimal route for network performance testing.

FIG. 5 is a flowchart of an example process 500 for identifying an optimal route for network performance testing. In some implementations, one or more process blocks of FIG. 5 may be performed by a device (e.g., the optimization system 115). In some implementations, one or more process blocks of FIG. 5 may be performed by another device or a group of devices separate from or including the device, such as a user device (e.g., the user device 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving user criteria associated with a route for network performance testing of a network (block 510). For example, the device may receive user criteria associated with a route for network performance testing of a network, as described above.

As further shown in FIG. 5, process 500 may include receiving network data associated with the network and cartographic data associated with a location of the network (block 520). For example, the device may receive network data associated with the network and cartographic data associated with a location of the network, as described above.

As further shown in FIG. 5, process 500 may include calculating network spatial data based on the user criteria and the network data (block 530). For example, the device may calculate network spatial data based on the user criteria and the network data, as described above.

As further shown in FIG. 5, process 500 may include performing, based on the user criteria, feature extraction of the network spatial data to calculate network statistics and to extract network event locations (block 540). For example, the device may perform, based on the user criteria, feature extraction of the network spatial data to calculate network statistics and to extract network event locations, as described above. In some implementations, the network statistics include one or more of reference signal received powers associated with the network, signal-to-interference-plus-noise ratios associated with the network, intra-cell handovers associated with the network, or inter-cell handovers associated with the network. In some implementations, the network event locations include one or more of intra-cell handover boundaries associated with the network or inter-cell handover boundaries associated with the network.

As further shown in FIG. 5, process 500 may include generating waypoint criteria based on the network statistics and the network event locations (block 550). For example, the device may generate waypoint criteria based on the network statistics and the network event locations, as described above. In some implementations, the waypoint criteria identify waypoints that are accessible by a vehicle and/or a remote device, such as a drone.

As further shown in FIG. 5, process 500 may include mapping the network spatial data to valid roadways identified in the cartographic data to generate mapped data (block 560). For example, the device may map the network spatial data to valid roadways identified in the cartographic data to generate mapped data, as described above.

As further shown in FIG. 5, process 500 may include identifying a list of viable waypoints based on comparing the mapped data and the waypoint criteria (block 570). For example, the device may identify a list of viable waypoints based on comparing the mapped data and the waypoint criteria, as described above. In some implementations, identifying the list of viable waypoints based on comparing the mapped data and the waypoint criteria includes determining whether the mapped data satisfies the waypoint criteria, and including, in the list of viable waypoints, waypoints associated with the mapped data that satisfies the waypoint criteria.

As further shown in FIG. 5, process 500 may include processing the list of viable waypoints, the network data, and the cartographic data, with a clustering model, to generate the route for the network performance testing (block 580). For example, the device may process the list of viable waypoints, the network data, and the cartographic data, with a clustering model, to generate the route for the network performance testing, as described above. In some implementations, processing the list of viable waypoints, the network data, and the cartographic data, with the clustering model, to generate the route for the network performance testing includes extracting centroids for the network data, mapping the centroids for the network data to a nearest road identified in the cartographic data, and generating the route for the network performance testing based on mapping the centroids for the network data to the nearest road. In some implementations, generating the route for the network performance testing includes utilizing a shortest-path-based route optimization to generate the route for the network performance testing. In some implementations, the route is associated with a particular radio frequency of the network.

In some implementations, process 500 includes performing one or more actions based on the route. In some implementations, performing the one or more actions includes one or more of providing the route to a user device, storing the route in a data structure, or providing driving instructions for the route to a user device. In some implementations, performing the one or more actions includes one or more of receiving a user input associated with the route and generating a modified route based on the user input, receiving network performance testing results associated with the route, or retraining the clustering model based on the route.

In some implementations, process 500 includes causing the route to be utilized to identify an area of the network with network performance issues. In some implementations, process 500 includes one or more of causing the route to be utilized to validate quality of service requirements of the network, or causing the route to be utilized to validate a coverage area of the network. In some implementations, process 500 includes one or more of causing the route to be utilized to test a new cell activation in the network, or providing the route to a third party for network performance testing of the network. In some implementations, the route may be utilized to trigger automated network performance testing with network-enabled autonomous vehicles and/or drones.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, user criteria associated with a route for network performance testing of a network;
   receiving, by the device, network data associated with the network and cartographic data associated with a location of the network;
   calculating, by the device, network spatial data based on the user criteria and the network data;
   performing, by the device and based on the user criteria, feature extraction of the network spatial data to calculate network statistics and to extract network event locations;
   generating, by the device, waypoint criteria based on the network statistics and the network event locations;
   mapping, by the device, the network spatial data to valid roadways identified in the cartographic data to generate mapped data;
   identifying, by the device, a list of viable waypoints based on comparing the mapped data and the waypoint criteria; and
   processing, by the device, the list of viable waypoints, the network data, and the cartographic data, with a clustering model, to generate the route for the network performance testing,
   wherein the route is associated with a particular radio frequency of the network.

2. The method of claim 1, further comprising:
   performing one or more actions based on the route.

3. The method of claim 2, wherein performing the one or more actions comprises one or more of:
- providing the route to a user device;
- storing the route in a data structure; or
- providing driving instructions for the route to a user device.

4. The method of claim 2, wherein performing the one or more actions comprises one or more of:
- receiving a user input associated with the route and generating a modified route based on the user input;
- receiving network performance testing results associated with the route; or
- retraining the clustering model based on the route.

5. The method of claim 1, wherein the network statistics include one or more of reference signal received powers associated with the network, signal-to-interference-plus-noise ratios associated with the network, intra-cell handovers associated with the network, or inter-cell handovers associated with the network.

6. The method of claim 1, wherein the network event locations include one or more of intra-cell handover boundaries associated with the network or inter-cell handover boundaries associated with the network.

7. The method of claim 1, wherein identifying the list of viable waypoints based on comparing the mapped data and the waypoint criteria comprises:
- determining whether the mapped data satisfies the waypoint criteria; and
- including, in the list of viable waypoints, waypoints associated with the mapped data that satisfies the waypoint criteria.

8. A device, comprising:
one or more processors configured to:
- receive user criteria associated with a route for network performance testing of a network;
- receive network data associated with the network and cartographic data associated with a location of the network;
- calculate network spatial data based on the user criteria and the network data;
- perform, based on the user criteria, feature extraction of the network spatial data to calculate network statistics and to extract network event locations;
- generate waypoint criteria based on the network statistics and the network event locations;
- map the network spatial data to valid roadways identified in the cartographic data to generate mapped data;
- identify a list of viable waypoints based on comparing the mapped data and the waypoint criteria;
- process the list of viable waypoints, the network data, and the cartographic data, with a clustering model, to generate the route for the network performance testing; and
- perform one or more actions based on the route.

9. The device of claim 8, wherein the waypoint criteria identify waypoints that are accessible by a vehicle and/or an autonomous device.

10. The device of claim 8, wherein the one or more processors, to process the list of viable waypoints, the network data, and the cartographic data, with the clustering model, to generate the route for the network performance testing, are configured to:
- extract centroids for the network data;
- map the centroids for the network data to a nearest road identified in the cartographic data; and
- generate the route for the network performance testing based on mapping the centroids for the network data to the nearest road.

11. The device of claim 10, wherein the one or more processors, to generate the route for the network performance testing, are configured to:
- utilize a shortest-path-based route optimization to generate the route for the network performance testing.

12. The device of claim 8, wherein the one or more processors are further configured to:
- cause the route to be utilized to identify an area of the network with network performance issues.

13. The device of claim 8, wherein the one or more processors are further configured to one or more of:
- cause the route to be utilized to validate quality of service requirements of the network; or
- cause the route to be utilized to validate a coverage area of the network.

14. The device of claim 8, wherein the one or more processors are further configured to one or more of:
- cause the route to be utilized to test a new cell activation in the network; or
- provide the route to a third party for network performance testing of the network.

15. A non-transitory computer-readable medium storing a set of instructions, the set of instructions comprising:
one or more instructions that, when executed by one or more processors of a device, cause the device to:
- receive user criteria associated with a route for network performance testing of a network;
- receive network data associated with the network and cartographic data associated with a location of the network;
- calculate network spatial data based on the user criteria and the network data;
- perform, based on the user criteria, feature extraction of the network spatial data to calculate network statistics and to extract network event locations;
- generate waypoint criteria based on the network statistics and the network event locations,
- wherein the waypoint criteria identify waypoints that are accessible by a vehicle;
- map the network spatial data to valid roadways identified in the cartographic data to generate mapped data;
- identify a list of viable waypoints based on comparing the mapped data and the waypoint criteria;
- process the list of viable waypoints, the network data, and the cartographic data, with a clustering model, to generate the route for the network performance testing; and
- perform one or more actions based on the route.

16. The non-transitory computer-readable medium of claim 15, wherein the one or more instructions, that cause the device to perform the one or more actions, cause the device to one or more of:
- cause the route to be utilized to identify an area of the network with network performance issues;
- cause the route to be utilized to validate quality of service requirements of the network;
- cause the route to be utilized to validate a coverage area of the network;
- cause the route to be utilized to test a new cell activation in the network; or
- provide the route to a third party for network performance testing of the network.

17. The non-transitory computer-readable medium of claim 15, wherein the one or more instructions, that cause the device to perform the one or more actions, cause the device to one or more of:
- provide the route to a user device;
- store the route in a data structure;
- provide driving instructions for the route to a user device;
- receive a user input about the route and generate a modified route based on the user input;
- receive network performance testing results associated with the route; or
- retrain the clustering model based on the route.

18. The non-transitory computer-readable medium of claim 15, wherein the one or more instructions, that cause the device to identify the list of viable waypoints based on comparing the mapped data and the waypoint criteria, cause the device to:
- determine whether the mapped data satisfies the waypoint criteria; and
- include, in the list of viable waypoints, waypoints associated with the mapped data that satisfies the waypoint criteria.

19. The non-transitory computer-readable medium of claim 15, wherein the one or more instructions, that cause the device to process the list of viable waypoints, the network data, and the cartographic data, with the clustering model, to generate the route for the network performance testing, cause the device to:
- extract centroids for the network data;
- map the centroids for the network data to a nearest road identified in the cartographic data; and
- generate the route for the network performance testing based on mapping the centroids for the network data to the nearest road.

20. The non-transitory computer-readable medium of claim 19, wherein the one or more instructions, that cause the device to generate the route for the network performance testing, cause the device to:
- utilize a shortest-path-based route optimization to generate the route for the network performance testing.

* * * * *